United States Patent [19]

Izumi et al.

[11] Patent Number: 5,248,189
[45] Date of Patent: Sep. 28, 1993

[54] SLIP CONTROL SYSTEM FOR VEHICLE

[75] Inventors: Tomoji Izumi; Hiroaki Sakamoto; Tetsuhiro Yamashita; Yoshito Watanabe, all of Hiroshima, Japan

[73] Assignee: Mazda Motor Corporation, Hiroshima, Japan

[21] Appl. No.: 943,528

[22] Filed: Sep. 11, 1992

[30] Foreign Application Priority Data

Sep. 12, 1991 [JP] Japan ................... 3-233203

[51] Int. Cl.$^5$ ............................. B60T 8/34
[52] U.S. Cl. ................. 303/113.3; 303/113.4; 303/114.3; 303/116.1
[58] Field of Search ............... 303/113.2, 113.4, 113.1, 303/114.3, 115.1, 116.1, 119.1, 100, 96, 98, 102, 103, 110, 93, 113.3; 180/197; 188/181 A, 181 T

[56] References Cited

U.S. PATENT DOCUMENTS

| 5,141,296 | 8/1992 | Arikawa ............... | 303/116.1 X |
| 5,178,441 | 1/1993 | Heibel et al. ............ | 303/113.4 X |

FOREIGN PATENT DOCUMENTS 63-162359  7/1988  Japan .

*Primary Examiner*—Douglas C. Butler
*Attorney, Agent, or Firm*—Sixbey, Friedman, Leedom & Ferguson

[57] ABSTRACT

A valve mechanism is provided in a hydraulic line which connects a master cylinder of a brake system and a brake provided for a driving wheel of a vehicle. When the slip of the driving wheel is larger than a predetermined value, the valve mechanism is selectively moved between a position where it directly applies brake fluid from the master cylinder to the brake and a position where it returns brake fluid discharged from the brake to an oil reservoir, thereby controlling the driving torque of the driving wheel to converge the slip of the driving wheels to a proper level. An oil pump is operated to return the brake fluid in the oil reservoir to the master cylinder when the valve mechanism is operated to effect the slip control. While the brake pedal is in the released state, the oil pump is kept operated during the slip control and for a predetermined time after interruption of the slip control so that the brake fluid in the oil reservoir is returned to the master cylinder substantially completely. When the brake pedal is depressed while the slip being effected, the slip control is ended and the oil pump is stopped. After the brake pedal is released, the oil pump is operated for a predetermined time.

1 Claim, 3 Drawing Sheets

SLIP CONTROL SYSTEM FOR VEHICLE

BACKGROUND OF THE INVENTION

1. Field of the Invention

This invention relates to a slip control system for a vehicle, and more particularly to a slip control system for a vehicle in which the driving wheels of the vehicle are prevented from slipping excessively by control of braking force.

2. Description of the Prior Art

Acceleration performance of a vehicle, especially during starting, is mainly governed by slip of the driving wheels relative to the road surface, and when the slip of the driving wheels exceeds a certain value, the acceleration performance of the vehicle largely deteriorates. Therefore, there have been proposed various systems for controlling the slip of the driving wheels to a proper level in order to keep an excellent acceleration performance. For example, as disclosed for instance in Japanese Unexamined Patent Publication No. 63(1988)-162359, there has been known a method of controlling slip of the driving wheels in which braking force applied to the driving wheels is controlled to control the driving torque of the driving wheels, thereby controlling the slip of the driving wheels to a proper level.

That is, in accordance with the method, a valve mechanism is provided in a hydraulic line which connects a master cylinder of the brake system and a brake provided for a driving wheel, and the valve mechanism is selectively moved between a position where it directly applies brake fluid from the master cylinder to the brake and a position where it returns brake fluid discharged from the brake to an oil reservoir, thereby controlling the driving torque of the driving wheel to converge the slip of the driving wheels to a proper level.

When the brake pedal is pushed down while such a slip control is being effected, the slip control is immediately interrupted and the brakes are applied preferentially.

When the brake fluid discharged from the brakes and returned to the oil reservoir is left there during the slip control, the amount of the brake fluid in the master cylinder reduces to cause excessive brake pedal travel.

In the conventional systems, in order to avoid such trouble, an oil pump is operated to return the brake fluid in the oil reservoir to the master cylinder when valve mechanism is operated to effect the slip control. Generally the oil pump is kept operated during the slip control and for a predetermined time after interruption of the slip control so that the brake fluid in the oil reservoir is returned to the master cylinder substantially completely.

However when the oil pump continues to return the brake fluid to the master cylinder after termination of the slip control in response to depression of the brake pedal, the brake pedal is kicked back to some extent under a counterforce of the brake fluid returned to the master cylinder and the kickback finely oscillates due to pulsation of the oil pump, which results in deterioration of braking feeling.

SUMMARY OF THE INVENTION

In view of the foregoing observations and description, the primary object of the present invention is to provide a slip control system for a vehicle which can improve the braking feeling when the brake pedal is pushed down while the slip control is being effected.

The slip control system in accordance with the present invention is characterized in that the oil pump is stopped when the brake pedal is depressed and the slip control is interrupted and is operated again in response to release of the brake pedal and is kept operated for a predetermined time.

That is, in accordance with the present invention, there is provided a slip control system for a vehicle having a driving wheel and a driven wheel comprising a slip detecting means which detects the slip value of the driving wheel on the basis of the difference between the rotational speed of the driven wheel and that of the driving wheel, a braking detecting means which detects depression of a brake pedal, a hydraulic pressure supply means which discharges brake fluid at a predetermined pressure in response to depression of the brake pedal, a brake which is provided for the driving wheel and is applied with a braking pressure corresponding to the pressure of brake fluid supplied from the hydraulic pressure supply means, a braking force adjusting means which adjusts the braking force for the driving wheel by controlling supply and discharge of the brake fluid to and from the brake, a brake fluid returning means which returns the brake fluid discharged from the brake and accumulated in a reservoir toward the hydraulic pressure supply means, and a control means which, when the slip value of the driving wheel detected by the slip detecting means is larger than a predetermined value and the brake pedal is not depressed, causes the hydraulic pressure supply means to discharge the hydraulic fluid at a predetermined pressure, causes the braking force adjusting means to effect slip control in which it adjusts the braking force for the driving wheel and controls the driving torque of the driving wheel so that the slip value of the driving wheel converges on a target value, and causes the brake fluid returning means to operate continuously during the slip control by the braking force adjusting means and for a predetermined time after the slip value of the driving wheel converges on the target value and the slip control is terminated, wherein the improvement comprises that, when the brake pedal is depressed while the braking force adjusting means is effecting the slip control, said control means causes the braking force adjusting means to interrupt the slip control in response to depression of the brake pedal and stops the brake fluid returning means, and the control means causes the brake fluid returning means to operate for a predetermined time after release of the brake pedal.

With this arrangement, while the brake pedal is released, the driving wheel can be prevented from excessively slipping and the amount of the brake fluid in the hydraulic pressure supply means can be normally held in a desirable level by virtue of the brake fluid returning means. When the brake pedal is depressed while the slip control is being effected, the slip control is immediately interrupted and the brake fluid returning means is stopped. Accordingly, the problem that the brake pedal is kicked back under a counterforce of the brake fluid returned to the hydraulic pressure supply means can be avoided. Further since the brake fluid returning means is operated again in response to release of the brake pedal and kept operated for a predetermined time, the brake fluid in the oil reservoir can be returned to the hydraulic pressure supply means substantially completely.

DESCRIPTION OF THE PREFERRED EMBODIMENT

Figure 1:
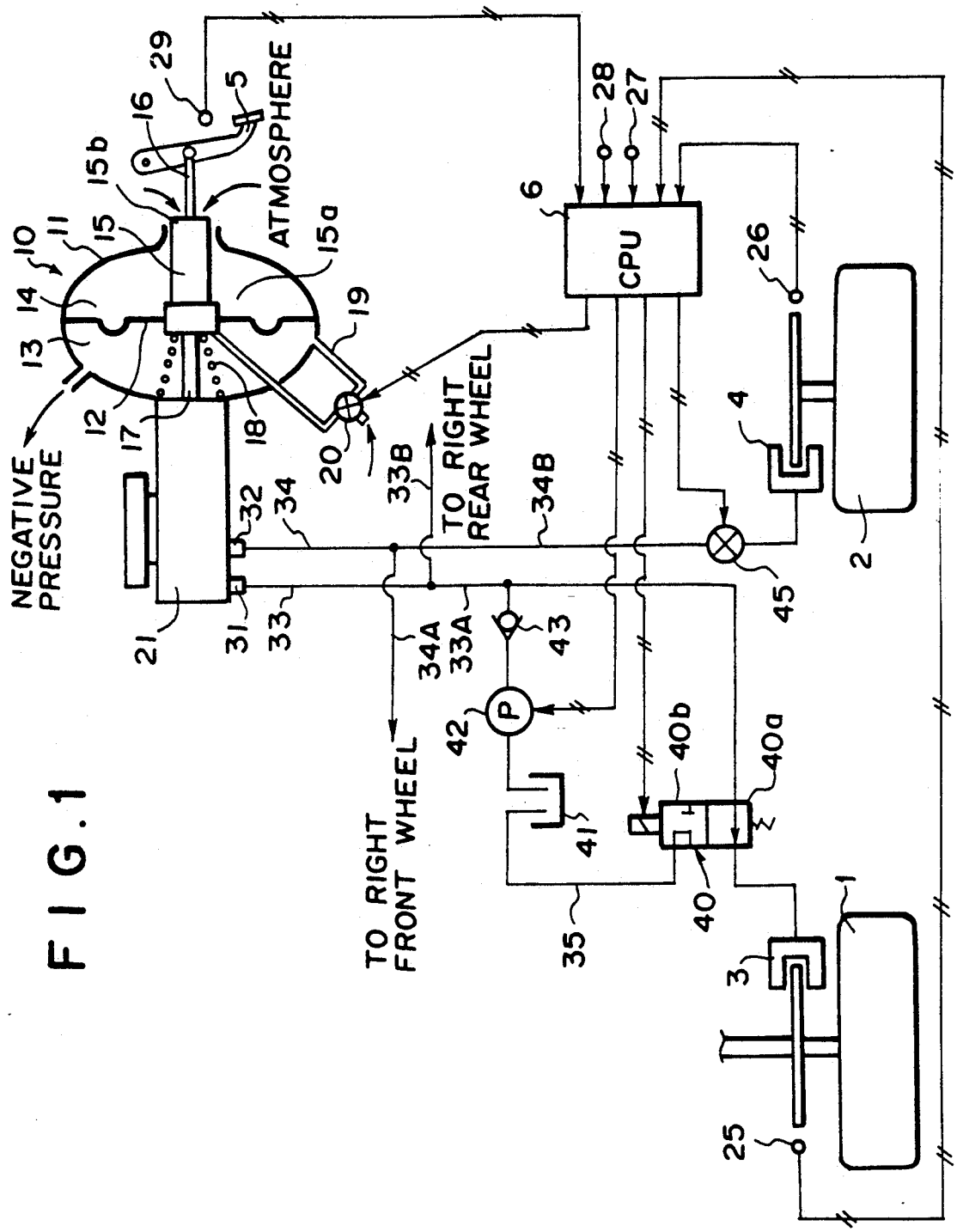
FIG. 1 is a schematic view showing a part of a brake system of a vehicle to which a slip control system in accordance with an embodiment of the present invention is applied.

In FIG. 1, a left front wheel (a driving wheel) 1 is provided with a hydraulic brake 3 and a left rear wheel (a driven wheel) 2 is provided with a hydraulic brake 4. The brakes 3 and 4 are operated by pressure of brake oil supplied from a master cylinder 21. Though not shown, right front rear wheels are provided with brakes which are of the same structure as the brakes 3 and 4. Wheel speed sensors 25 and 26 respectively detect rotational speeds of the left front and rear wheels 1 and 2. Output signals of the wheel speed sensors 25 and 26 are input into a control unit 6 and the slip of the left front wheel 1 is calculated on the basis of the output signals. In FIG. 1, reference numerals 27 and 28 respectively denote wheel speed sensors which detect the rotational speeds of the right front and rear wheels (not shown).

The master cylinder 21 is provided with a pair of discharge ports 31 and 32 which are respectively connected to first and second pressure lines 33 and 34. The first pressure line 33 branches into branch lines 33A and 33B which are respectively connected to the brake for the right rear wheel and the brake 3 for the left front wheel 1. The second pressure line 34 branches into branch lines 34A and 34B which are respectively connected to the brake for the right front wheel and the brake 4 for the left rear wheel 2.

A brake pedal 5 is connected to the master cylinder 21 by way of a booster 10. The booster 10 is of a known structure and has a casing 11 the inner space of which is divided into first and second chambers 13 and 14 by a diaphragm 12. A switching valve 15 is mounted in the casing 11 with one end 15a fixed to the diaphragm 12 and with the other end 15b extending through the casing to be slidable back and forth.

A negative pressure is normally applied to the first chamber 13 of the casing 11. As will be described in detail later, the second chamber 14 is selectively communicated with the first chamber 13 so that the negative pressure in the first chamber 13 is applied thereto or with the atmosphere by operation of the switching valve 15 or a three-way valve 20 to be described later.

The switching valve 15 is of a known structure and has an input shaft 16 which is connected to the brake pedal at one end and an output shaft 17 which is connected to the diaphragm 12 at one end and moves integrally with the switching valve 15 to drive the master cylinder 21 in response to displacement of the diaphragm 12. The switching valve 15 is urged toward the second chamber 14 by a spring 18.

The switching valve 15 has a first valve seat (not shown) which communicates the first chamber 13 with the second chamber 14 by way of an air pipe 19 or isolates the former from the latter, and a second valve seat (not shown) which communicates the second chamber 14 with an air inlet (not shown) which is formed in the end 15b of the switching valve 15 to open to the atmosphere and isolates the former from the latter. While the brake pedal 5 is released, the first valve seat is opened and the second valve seat is closed, and when the brake pedal 5 is pushed down and the input shaft 16 is pushed, the first valve seat is closed and the second valve seat is opened.

The air pipe 19 is disposed between the first valve seat of the switching valve 15 and the first chamber 13, and said three-way valve 20 is provided in the air pipe 19. The three-way valve 20 has an opening which opens to the atmosphere. The three-way valve 20 is opened and closed by a control signal from the control unit 6, and when the first valve seat is opened, the atmospheric pressure or the negative pressure in the first chamber 13 can be selectively applied to the second chamber 14 by opening and closing of the three-way valve 20.

When the brake pedal 5 is released, the first valve seat of the switching valve 15 is opened and the second valve seat is closed as described above. In this state, the pressure in the second chamber 14 is governed by the position of the three-way valve 20. That is, when the three-way valve 20 opens to the first chamber 13, the pressures in the first and second chambers 13 and 14 balance since the negative pressure in the first chamber 13 is introduced into the second chamber 14, and accordingly the diaphragm 12 is held in the neutral position and the master cylinder 21 is not operated. On the other hand, when the three-way valve 20 opens to the atmosphere, the atmospheric pressure is introduced into the second chamber 14 and the diaphragm 12 is displaced toward the first chamber 13, whereby the output shaft 17 is pushed toward the master cylinder 21 and the master cylinder 21 discharges the brake oil to the first and second pressure lines 33 and 34 at a predetermined pressure. That is, the brakes 3 and 4 are applied without depression of the brake pedal 5. The slip control is effected in this state.

When the brake pedal 5 is pushed down, the first valve seat of the switching valve 15 is closed and the second valve seat is opened, whereby the atmospheric pressure is introduced into the second chamber 14 through the second valve seat. In this state, the output shaft 17 is driven according to depression of the brake pedal 5 irrespective of the position of the three-way valve 20 and the master cylinder 21 discharges the brake oil to effect the normal braking.

A switching solenoid valve 40 is provided in the branch line 33A of the first pressure line 33 and is controlled by the control unit 6. A return line 35 opens to the branch line 33A upstream of the switching solenoid valve 40 at one end and is connected to the switching solenoid valve 40 at the other end. When the switching solenoid valve 40 is in a first valve position 40a, the branch line 33A is directly connected to the brake 3 and a predetermined braking pressure or an increasing braking 10 pressure is applied to the brake 3 by the brake oil supplied from the master cylinder 21. On the other hand, when the switching solenoid valve 40 is in a second valve 1 position 40b, the brake 3 is communicated with the return line 35 and the braking oil in the brake 3 is discharged to an oil reservoir 41 provided in the return line 35 between the branch line and the switching solenoid valve 40, whereby the braking pressure applied to the brake 3 is gradually lowered.

In the return line 35 between the oil reservoir 41 and the branch line 33A, there are provided an oil pump 42 and a check valve 43. The oil pump 42 is for returning the brake oil accumulated in the oil reservoir 41 toward the master cylinder 21 by way of the branch line 33A. The oil pump 42 is controlled by the control unit 6.

An on-off valve 45 is provided in the branch line 34B of the second pressure line 34. The on-off valve 45 is opened and closed by the control unit 6 and the brake oil is supplied to the brake 4 when the on-off valve 45 is open.

The control unit 6 effects the slip control by controlling the switching solenoid valve 40. That is, the control unit 6 receives wheel speed signals from the wheel speed sensors 25 to 28 and a brake depression signal from a brake switch 29 which detects the position of the brake pedal 5. Then the control unit 6 calculates the slip value of the left front wheel 1 (or the right front wheel) on the basis of the wheel speed signals, and when the slip value is larger than a predetermined value, the control unit 6 causes the switching solenoid valve 40 to effect the slip control, i.e., to apply the brake to the front wheel (the driving wheel) to converge the slip value on a predetermined value.

When the brake pedal 5 is in the released state, the control unit 6 causes the three-way valve 20 to open to the atmosphere, thereby causing the master cylinder 21 to discharge the brake oil, causes the on-off valve 45 to close, causes the switching solenoid valve 40 to move the first valve position 40a so that the brake oil can be supplied to the brake 3 and causes the oil pump 42 to operate. That is, the control unit 6 operates the oil pump 42 simultaneously with initiation of the slip control by the switching solenoid valve 40. (See points P1 on lines (a) and (c) in FIG. 2)

The switching solenoid valve 40 is not held in the first valve position 40a through the slip control but is moved between the first valve position 40a and the second valve position 40b according to the difference between the actual slip value and the predetermined slip value so that the former gradually converges on the latter. Accordingly, when the switching solenoid valve 40 is in the second valve position 40b, the brake oil is discharged from the brake 3 and accumulates in the oil reservoir 41. However since the oil pump 42 is operated in this case, the brake oil in the oil reservoir 41 is returned toward the master cylinder 21 through the branch line 33A and a proper amount of brake oil can be ensured on the side of the master cylinder 21.

When the brake pedal 5 is pushed down while the slip control is being effected and the brake switch 29 detects the depression of the brake pedal 5, the control unit 6 moves the switching solenoid valve 40 to the first valve position 40a and holds it there, that is, the control unit 6 interrupts the slip control. (See points P2 on lines (a) and (b) in FIG. 2) At the same time, the control unit 6 closes the on-off valve 45. Accordingly a braking pressure is applied to each of the brakes according to the amount of depression of the brake pedal 5 and the vehicle is immediately braked.

Figure 2:
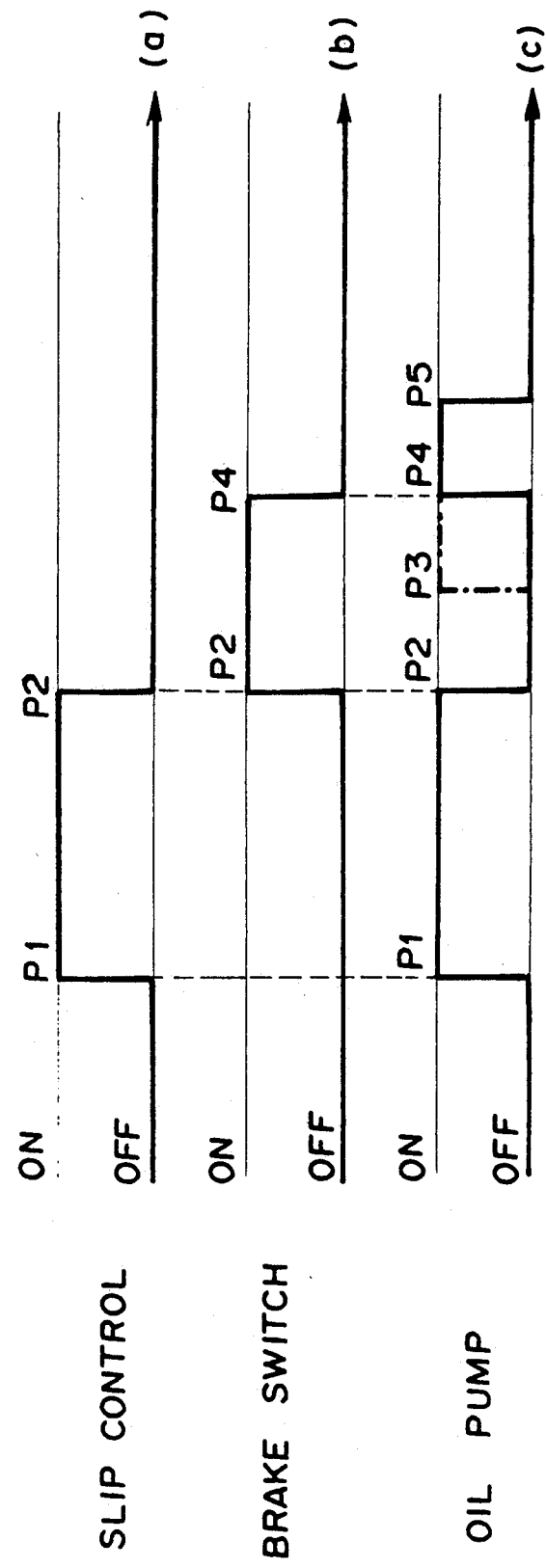
FIG. 2 is a time chart for illustrating control performed by the slip control system of the embodiment.

In the conventional systems, the oil pump 42 is kept operated for a predetermined time after the brake pedal 5 is depressed and the slip control is interrupted as shown by the range between point P2 and P3 on the line (c) in FIG. 2, which gives rise to the problems described above.

In accordance with the present invention, the oil pump 42 is once stopped in response to interruption of the slip control as shown by point P2 on line (c) in FIG. 2, and then is operated again after the brake pedal 5 is released and kept operated for a predetermined time thereafter as shown by the rang between point P4 and P5 on the line (c). With this arrangement, braking and returning of the brake oil cannot overlap with each other, whereby the aforesaid problem inherent to the conventional systems that the brake pedal is kicked back to some extent under a counterforce of the brake fluid returned to the master cylinder and the kickback finely oscillates due to pulsation of the oil pump can be avoided.

Figure 3:
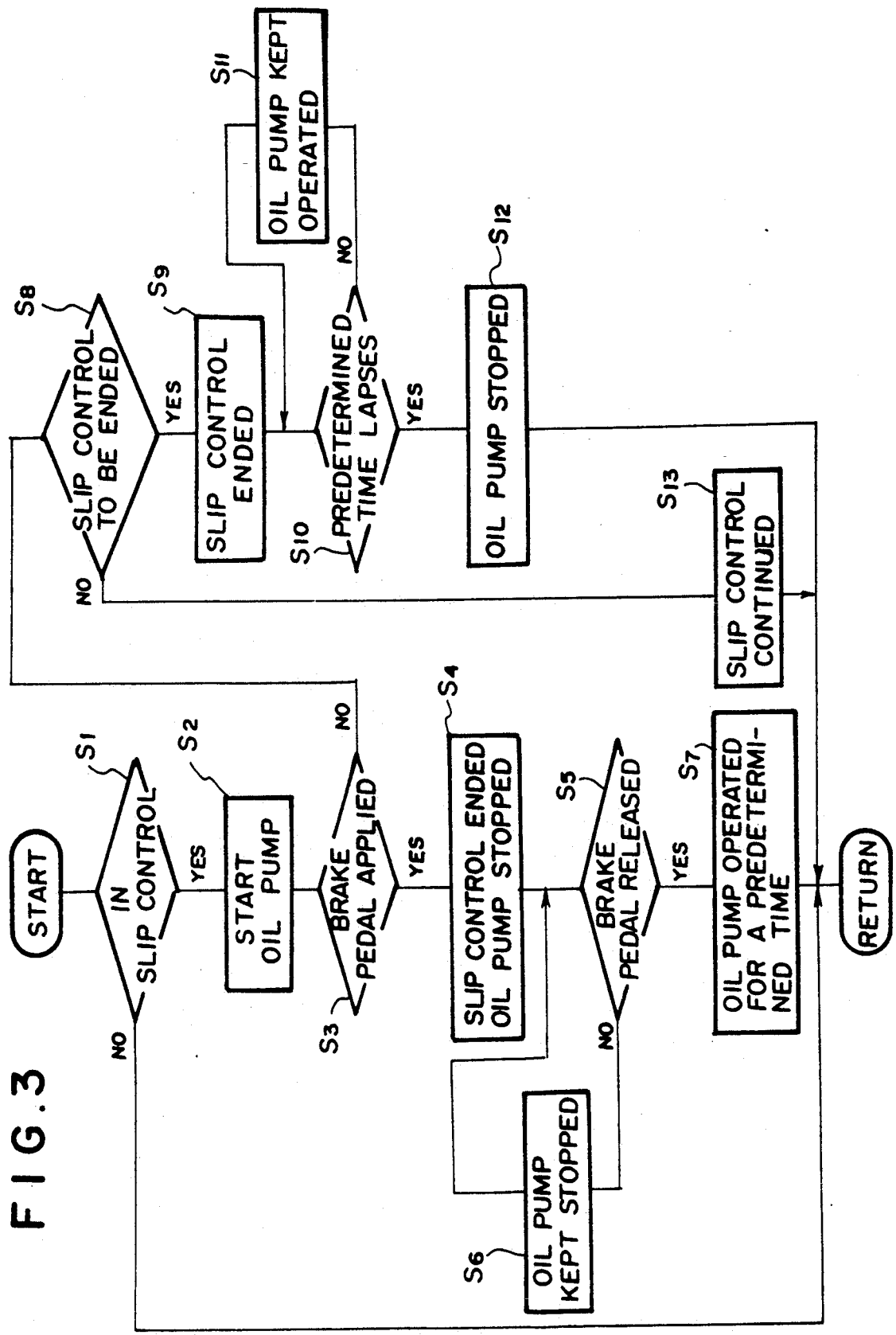
FIG. 3 is a flow chart showing an example of the control which the control unit performs during the slip control.

FIG. 3 shows a flow chart showing an example of the control which the control unit 6 performs during the slip control. In FIG. 3, the control unit 6 begins to operate the oil pump in response to initiation of the slip control. (steps S1 and S2) Then the control unit 6 determines in step S3 whether the brake pedal 5 is pushed down. When it is determined that the brake pedal 5 is pushed down, the control unit 6 immediately interrupts the slip control (i.e., immediately moves the switching solenoid valve 40 to the first valve position 40a and holds it there) and stops the oil pump 42. (step S4) The control unit 6 keeps the oil pump 42 stopped until the brake pedal 5 is released. (steps S5 and S6) When the brake pedal 5 is released, the control unit 6 operates the oil pump 42 for a predetermined time. (step S7)

On the other hand, when it is determined in step S3 that the brake pedal 5 is not applied, the control unit 6 determines in step S8 whether the condition of terminating the slip control has been satisfied, and when it is determined that the condition of terminating the slip control has not been satisfied, the control unit 6 continues the slip control (step S13). On the other hand, when it is determined in step S8 that the condition of terminating the slip control has been satisfied, the control unit 6 immediately terminates the slip control in step S9 (i.e., immediately moves the switching solenoid valve 40 to the first valve position 40a and holds it there) but operates the oil pump 42 for a predetermined time after termination of the slip control as shown by the range between points P2 and P3 on the line (c) in FIG. 2. (steps S9 to S12)

What is claimed is:
1. A slip control system for a vehicle having a driving wheel and a driven wheel comprising
a slip detecting means which detects the slip value of the driving wheel on the basis of the difference between the rotational speed of the driven wheel and that of the driving wheel,
a braking detecting means which detects depression of a brake pedal,
a hydraulic pressure supply means which discharges brake fluid at a predetermined pressure in response to depression of the brake pedal,
a brake which is provided for the driving wheel and is applied with a braking pressure corresponding to the pressure of brake fluid supplied from the hydraulic pressure supply means,
a braking force adjusting means which adjusts the braking force for the driving wheel by controlling supply and discharge of the brake fluid to and from the brake,
a brake fluid returning means which returns the brake fluid discharged from the brake and accumulated in a reservoir toward the hydraulic pressure supply means, and a control means which, when the slip value of the driving wheel detected by the slip detecting means is larger than a predetermined value and the brake pedal is not depressed, causes the hydraulic pressure supply means to discharge the hydraulic fluid at a predetermined pressure, causes the braking force adjusting means to effect slip control in which it adjusts the braking force for the driving wheel and controls the driving torque of the driving wheel so that the slip value of the driving wheel converges on a target value, and causes the brake fluid returning means to operate continuously during the slip control by the braking force adjusting means and for a predetermined time after the slip value of the driving wheel converges on the target value and the slip control is terminated, wherein the improvement comprises that, when the brake pedal is depressed while the braking force adjusting means is effecting the slip control, said control means causes the braking force adjusting means to interrupt the slip control in response to depression of the brake pedal and stops the brake fluid returning means, and the control means causes the brake fluid returning means to operate for a predetermined time after release of the brake pedal.

* * * * *